United States Patent [19]

Stoll et al.

[11] Patent Number: 5,340,267

[45] Date of Patent: Aug. 23, 1994

[54] RETRACTABLE VEHICLE RAMP WITH LIFT ASSIST

[75] Inventors: Donald E. Stoll, Berkey; Alfred T. Dietrich, Marion, both of Ohio

[73] Assignee: Overhead Door Corporation, Dallas, Tex.

[21] Appl. No.: 809,734

[22] Filed: Dec. 17, 1991

[51] Int. Cl.$^5$ ................................................ B60P 1/43
[52] U.S. Cl. ................................... 414/537; 14/71.1
[58] Field of Search ............... 414/537; 14/69.5, 71.1

[56] References Cited

U.S. PATENT DOCUMENTS

| | | | |
|---|---|---|---|
| 2,228,946 | 1/1941 | Carter | 414/537 |
| 3,233,767 | 2/1966 | Goodacre | 414/537 X |
| 3,511,393 | 5/1970 | Abromavage et al. | 414/537 |
| 3,730,361 | 5/1973 | Haynes | 414/537 |
| 3,743,121 | 7/1973 | Langer | 414/537 X |
| 3,901,398 | 8/1975 | Bunch | 414/537 X |
| 3,913,763 | 10/1975 | Lee | 414/537 X |
| 4,198,187 | 4/1980 | Mountz | 414/537 |
| 4,242,032 | 12/1980 | Whiteman et al. | 414/537 |
| 4,294,571 | 10/1981 | Tordella | 414/537 |
| 4,647,270 | 3/1987 | Maloney | 414/537 X |
| 4,657,233 | 4/1987 | Vroom | 414/537 X |
| 4,685,857 | 8/1987 | Goeser et al. | 414/537 X |
| 4,722,109 | 2/1988 | Mountz | 414/537 X |
| 4,878,800 | 11/1989 | Dell | 414/537 X |
| 5,122,024 | 6/1992 | Stokes | 414/537 X |
| 5,133,634 | 7/1992 | Gingrich et al. | 414/537 |
| 5,199,150 | 4/1993 | Mortenson | 414/537 X |

FOREIGN PATENT DOCUMENTS

| 60044 | 4/1985 | Japan | 414/537 |
|---|---|---|---|

OTHER PUBLICATIONS

Todco "Rollaramp" brochure, date unknown.

*Primary Examiner*—David A. Bucci
*Attorney, Agent, or Firm*—Glaser, Griggs & Schwartz

[57] ABSTRACT

A retractable ramp mechanism for a vehicle includes a frame mounted to the vehicle and a ramp mounted to the frame by way of a linkage for movements between stowed and extended positions. The linkage is constructed and arranged to permit an inner end of the ramp to pivot upwardly with respect to the frame from a lower position to an engagement position. In the engagement position, the inner end of the ramp may be engaged with a work surface of the vehicle. The linkage includes a mechanism for applying a biasing force to bias the inner end of the ramp upwardly to the engagement position when the ramp is in the extended position.

2 Claims, 3 Drawing Sheets

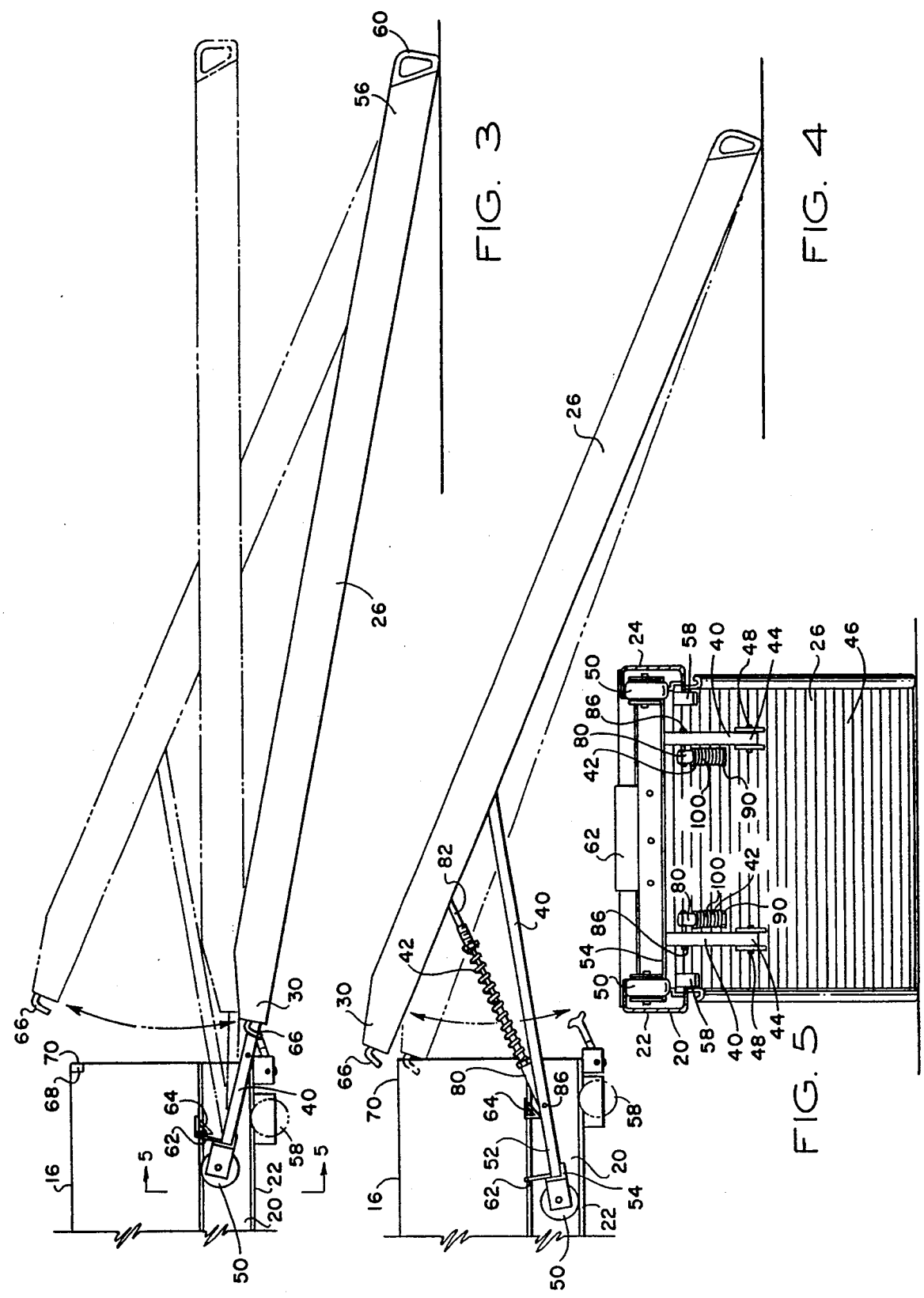

RETRACTABLE VEHICLE RAMP WITH LIFT ASSIST

FIELD OF INVENTION

This invention relates to motor vehicles, such as trucks, and more particularly to a ramp for a vehicle to facilitate loading and unloading.

BACKGROUND OF THE INVENTION

Many vehicles are fitted with retractable ramps to facilitate loading and unloading. A typical retractable ramp attaches to the rear of a vehicle and slopes downwardly to the ground in its operative position. The ramp is retracted beneath the vehicle body for storage when not in use.

Retractable ramps currently available are typically heavy and somewhat cumbersome for an individual operator to use due to the strong construction necessary for load-carrying ability and the long length of the ramps. Where the ramp is stored beneath the body of the vehicle, the inner end of the extended ramp must be lifted a significant distance to be engaged to the vehicle work surface.

Thus, there presently exists a need for a ramp mechanism that reduces the effort necessary to raise the inner end of a ramp upwardly to the engagement position when the ramp is in the extended position. Preferably, such a mechanism will not interfere with currently existing retractable ramp designs.

SUMMARY OF THE INVENTION

The present invention provides a ramp mechanism for providing a lift assist to the inner end of a retractable ramp. The ramp is mounted to a ramp frame by way of a wheeled linkage for movements between stowed and extended positions with respect to the frame. The linkage is constructed and arranged to permit an inner end of the ramp to pivot upwardly with respect to the frame to an engagement position when the ramp is in the extended position. In the engagement position, the inner end of the ramp may be engaged with the work surface of the vehicle. The linkage includes biasing means for biasing the inner end of the ramp upwardly to the engagement position when the ramp is in the extended position. In the preferred embodiment, the linkage and biasing means are readily integratable into present retractable ramp designs and do not interfere with smooth operation of the retractable ramp.

BRIEF DESCRIPTION OF THE DRAWINGS

A more complete understanding of the invention and its advantages will be apparent from the Detailed Description taken in conjunction with the accompanying Drawings in which:

FIGS. 3 and 4 are schematic side views illustrating movements of the ramp inner end to its engagement position;

FIG. 5 is a sectional view taken along lines 5—5 of FIG. 3;

DETAILED DESCRIPTION OF THE PREFERRED EMBODIMENT

Referring initially to FIGS. 1-6, where like numerals indicate like and corresponding elements, a vehicle 10 includes a cab 12 and a cargo compartment 14. Floor 16 of cargo compartment 14 is a work surface for holding cargo and for facilitating loading and unloading of cargo. It will be understood that the invention is usable with a variety of different kinds of vehicles, including flat bed trucks where no enclosure is provided over work surface 16.

Figure 1:
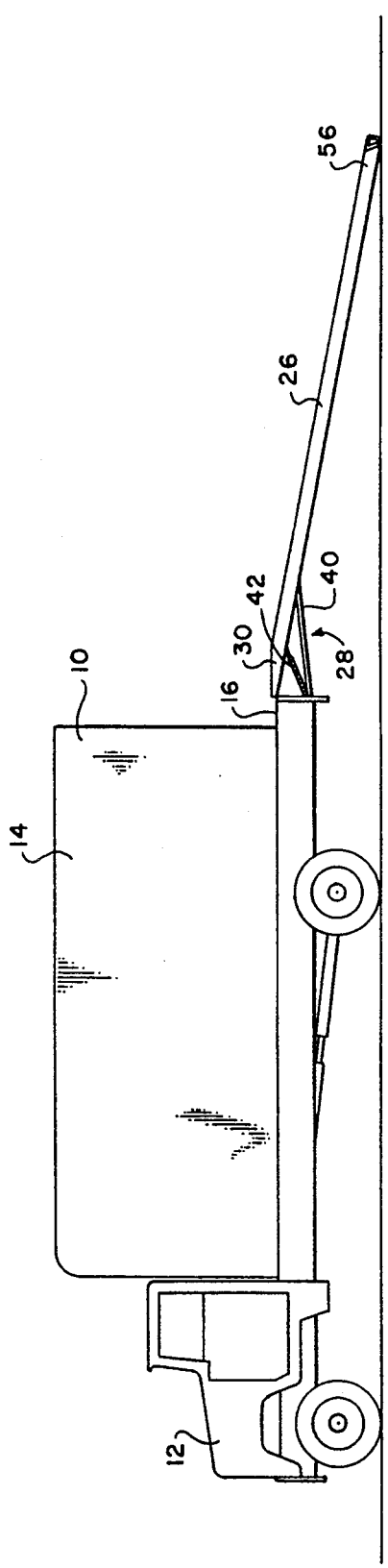
FIG. 1 is side view of a vehicle fitted with the ramp of the present invention shown in the extended position.

A ramp frame 20 is mounted to vehicle 10. As best shown in FIG. 5, frame 20 includes two inwardly-facing channels 22 and 24. A ramp 26 is mounted to frame 20 by way of a linkage 28 (FIG. 1) for movements between stowed and extended positions with respect to frame 20. FIG. 1 illustrates ramp 26 in the extended position while FIG. 2 illustrates ramp 26 in the stowed position.

Linkage 28 is constructed and arranged to permit an inner end 30 of ramp 26 to pivot upwardly with respect to the frame 20 from a lower position to an engagement position when the ramp 26 is in the extended position. Inner end 30 may be engaged with work surface 16 of vehicle 10 when inner end 30 is in the engagement position. Inner end 30 is illustrated in the engagement position in FIGS. 1 and 6, while FIGS. 3 and 5 illustrate inner end 30 in the lower position. The dotted lines in FIGS. 3 and 4 illustrate the pivoting movements of inner end 30 between the lower and engagement positions.

Linkage 28 preferably includes two fixed links 40 and two telescoping links 42. Fixed links 40 are laterally-spaced and parallel, as best shown in FIG. 5. Each fixed link 40 has an outer end 44 (FIGS. 5 and 6) pivotally connected to an under side 46 of ramp 26 at laterally-spaced fixed link pivot points 48. Fixed links 40 extend from fixed link pivot points 48 to laterally-spaced wheels 50 fixed to inner ends 52 of fixed links 40 by way of cross bar 54. Wheels 50 are engaged with frame 20 by constrainment between channels 22 and 24.

Figure 2:
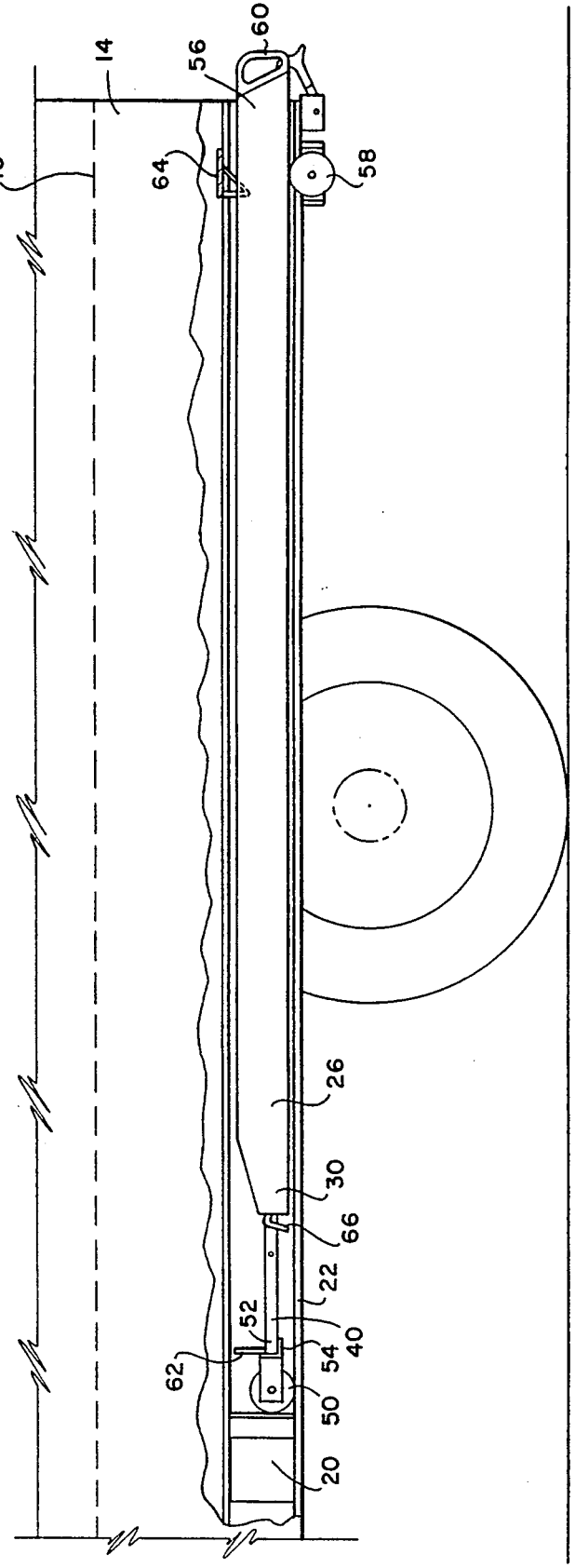
FIG. 2 is a partially broken away side view of the ramp of FIG. 1 in its stowed position.

As best shown in FIG. 2, when ramp 26 is in the stowed position, inner end 30 is supported by wheels 50 riding on channels 22 and 24, while outer end 56 of ramp 26 is supported by wheels 58. Ramp 26 is moved to the extended position by pulling on handles 60 and lowering outer end 56 to the ground, as shown in FIG. 3. A stop plate 62 connected to cross bar 54 contacts ramp stop 64 when ramp 26 is fully extended, signaling the operator to cease withdrawing ramp 26 from frame 20. Inner end 30 of ramp 26 may then be pivoted upwardly with respect to frame 20 as shown in FIGS. 3 and 4. Inner end 30 includes two hooks 66 which engage in slots 68 (FIG. 3) in sill 70 of work surface 16. It will appreciated that ramp 26 is stowed neatly and out of the way when in the stowed position shown by FIG. 2, and is conveniently extendable for engagement to the work surface when in the extended position, such that operators may easily carry cargo into compartment 14 by walking up ramp 26 from the ground.

A key feature in the invention is linkage 28, which enables the operator to easily shift inner end 30 from the lower position to the engagement position. It will be appreciated that it is desirable for ramp 26 to adequately carry heavy loads over long spans, which results in a fairly heavy construction. Without lift assist, substantial lifting force can be expected when lifting inner end 30 from the lower position upwardly to the engagement position. Linkage 28 includes biasing means for biasing inner end 30 of ramp 26 upwardly to the engagement position, thereby substantially reducing the lifting force required to engage inner end 30. In the preferred embodiment, linkage 28 includes a toggle mechanism, such that the biasing means is inoperable when the ramp inner end 30 is in the lower position, as shown in FIGS. 2, 3 and 5, and the biasing means is operable when ramp inner end 30 is pivoted upwardly to the engagement position.

Figure 6:
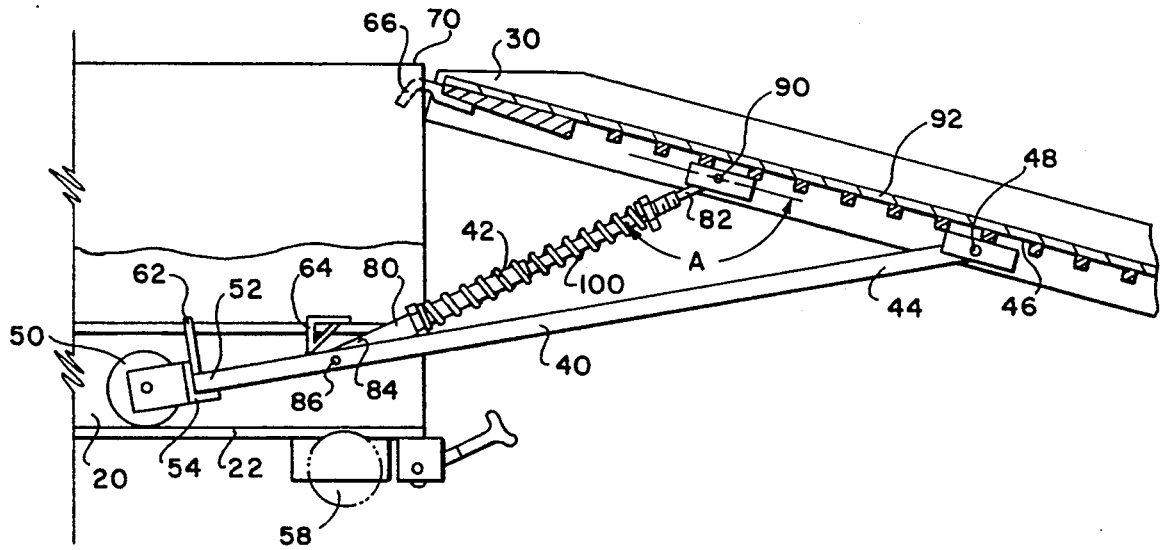
FIG. 6 is a partially broken away side view of the ramp inner end in its engagement position.
Figure 7:
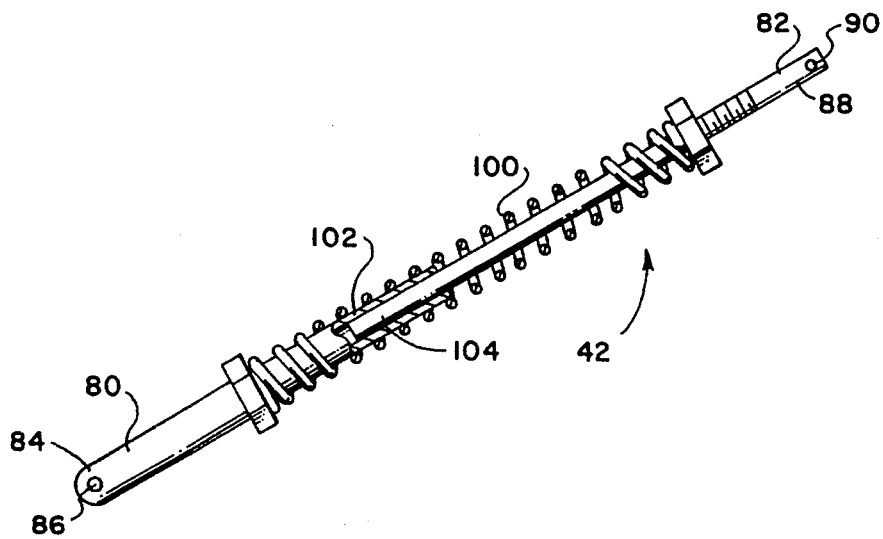
FIG. 7 is a partially broken away side view of a telescoping link used in the preferred embodiment of the invention.

Referring now to FIG. 7 in addition to FIGS. 1–6, linkage 28 preferably includes telescoping links 42 arranged with the fixed links and ramp to provide biasing force by way of a toggle mechanism. Each telescoping link 42 includes an inner member 80 and an outer member 82 constrained for telescoping, collinear motion. ("Inner" and "outer" herein refer to an element's location with respect to the vehicle.) Each inner member 80 has an end 84 pivotally connected to one of the fixed links 40 at a location 86 intermediate the inner ends 52 and outer ends 44 of the fixed links. Each outer member 82 has an end 88 pivotally connected to ramp 26 at laterally-spaced telescoping link pivot points 90. Telescoping link pivot points 90 are located intermediate the fixed link pivot points 48 and inner end 30 of ramp 26. A lever portion 92 (FIG. 6) of the ramp extends longitudinally between the fixed link pivot points 48 and the telescoping link pivot points 90. The fixed links 40, telescoping links 42 and ramp lever portion 92 are parallel when ramp inner end 30 is in the lower position, as shown in FIGS. 2, 3 and 5. Fixed links 40, telescoping links 42 and ramp lever portion 92 are transformed into a triangular configuration, as shown in FIGS. 1, 4 and 6, when ramp inner end 30 is pivoted upwardly away from the lower position in the direction of the engagement position. In this procedure, telescoping links 42 and ramp lever portion 92 are transformed from being parallel to having an obtuse included angle A (FIG. 6) therebetween.

The biasing means of linkage 28 includes a compression spring 100 acting on each telescoping link 42 to bias the inner and outer members 80, 82 away from each other. As best shown in FIG. 7, inner member 80 includes a tubular portion 102 sized to accept a cylindrical portion 104 of outer member 82. A rotating force is thus applied by spring 100 to ramp inner end 30 by way of inner and outer members 80, 82. However, in the lower position, i.e., when telescoping links 42 and ramp lever portion 92 are parallel such that included angle A is 180°, no rotating force is applied to ramp inner end 30. Rotating force is applied to ramp inner end 30 by way of ramp lever portion 92 only when the included angle A between the telescoping links 42 and ramp lever portion 92 changes from 180° to an angle less than 180°, as shown in FIG. 6.

In operation, use of the ramp is facilitated by extending ramp 26 to the position shown in FIG. 3, and then lowering outer end 56 to the ground. While in the stowed position and extended positions, no rotating force is applied to ramp inner end 30 as long as ramp inner end 30 is maintained in the lower position, as shown in FIGS. 2, 3 and 5. The inoperability of the biasing means while ramp inner end 30 is in the lower position has several advantages. First, the absence of a rotating force allows the ramp to be easily extending without binding, and the frame 20 does not need to provide any containing structure to resist the rotating force. In addition, the biasing means can easily be retrofitted to existing ramps, which typically have the fixed links and ramp structure shown, by the simple addition of telescoping links 42. Another advantage comes into play when the ramp is in the fully extended position, as shown in FIG. 3. With no rotating force applied, the ramp inner end is stable until the operator is ready to pivot it upwardly to the engagement position. Without the stability provided by the toggle mechanism, the ramp would suddenly spring upwardly once it was withdrawn to the extended position. The biasing means becomes operable when the operator provides a slight lifting force to reduce included angle A from 180°. The forces applied by compression springs 100 then have an effective lever arm provided by ramp lever portion 92, and a rotating force is applied. The rotating force is gradually and smoothly increased from zero as angle A decreases. The rotating force preferably increases to a value less than the total weight of inner end 30, such that inner end 30 in the engagement position is stable. Ramp 26 is then fully deployed for use. Stowage of the ramp is accomplished by reversing these steps.

While we have described a preferred embodiment of the invention, numerous modifications, alterations, alternate embodiments, and alternate materials may be contemplated by those skilled in the art and may be utilizing in accomplishing the present invention. It is envisioned that all such alternate embodiments are considered to be within the scope of the present invention as defined by the appended claims. For example, several alternate embodiments of the biasing means are contemplated, such as tension springs and torsion springs.

We claim:

1. A ramp mechanism for a vehicle, comprising:
   frame means mounted to the vehicle beneath a vehicle work surface;
   a ramp interconnected with the frame by way of a toggle linkage for movement between stowed and extended positions with respect to the frame, said ramp having an outer end which, when in its extended position, engages the ground and having in inner end pivotally positionable between a lower position adjacent the frame and an upper position for engagement with said work surface of the vehicle;
   stop means for inhibiting disengagement of the toggle linkage from the frame;
   said toggle linkage comprising (i) fixed link means having its outer end pivotally connected to said ramp and its inner end interconnected with said frame and (ii) a telescoping link having its inner end pivotally connected to said fixed link and its outer end pivotally connected to said ramp;
   the ramp, fixed link and telescoping link defining a triangular configuration with a first angle definable between the telescoping link and the ramp;
   said linkage further comprising (iii) biasing means for biasing said inner end of the ramp from its lower position toward its upper position;
   said biasing means being inoperative when said ramp and said telescoping link are parallel and said first angle is 180°, said biasing means being effective in of itself to impart a pivoting force to pivot the inner end of said ramp from its lower position toward its upper position without requirement of any additional force, once said first angle is less than 180°, the pivoting force imparted to the inner end of said ramp increasing as said first angle decreases.

2. The mechanism as defined by claim 1 wherein said biasing means comprises a compression spring acting upon said telescoping link.

* * * * *